United States Patent [19]

Holmes

[11] Patent Number: 4,480,530

[45] Date of Patent: Nov. 6, 1984

[54] BRAKING ACTUATOR

[75] Inventor: Paul M. Holmes, Jackson, Mich.

[73] Assignee: Aeroquip Corporation, Jackson, Mich.

[21] Appl. No.: 392,543

[22] Filed: Jun. 28, 1982

[51] Int. Cl.³ .................... F01B 31/00; F15B 21/04; F16J 10/02
[52] U.S. Cl. .......................................... 92/78; 92/63; 92/86; 92/114; 92/169; 403/326
[58] Field of Search .................. 92/63, 130 A, 78, 114, 92/86, 169 R; 403/326

[56] References Cited

U.S. PATENT DOCUMENTS

| 1,698,087 | 1/1929 | Field | 403/326 |
| 2,854,954 | 10/1958 | Howze | 92/130 A |
| 3,136,227 | 6/1964 | Williams | 92/63 |
| 3,495,503 | 2/1970 | Gummer et al. | 92/63 |
| 3,508,470 | 4/1970 | Swander, Jr. et al. | 92/63 |
| 3,572,162 | 3/1971 | Gresham et al. | 403/326 |
| 3,717,072 | 2/1973 | Kaltenthaler et al. | 92/63 |
| 3,977,308 | 8/1976 | Swander, Jr. et al. | 92/130 A |
| 4,247,147 | 1/1981 | Rettowski | 403/326 |

FOREIGN PATENT DOCUMENTS 2018361 10/1979 United Kingdom ................ 92/63

OTHER PUBLICATIONS

Aeroquip Corporation-Bulletin 8153-Maxibrake "R" Spring Brake-4 pages-Copyrighted 1979.

Primary Examiner—Paul E. Maslousky
Attorney, Agent, or Firm—Beaman & Beaman

[57] ABSTRACT

The invention pertains to vehicle brake actuators of the expansible motor type wherein the actuator includes a cylinder having a piston and piston rod assembly reciprocal therein, a helical spring biases the piston in a braking direction, and a pressurized medium, such as hydraulic fluid, forces the piston in a spring compressing direction. The unique features include a piston drawn from sheet metal wherein the piston rod is pressed thereinto, and the piston seals are retained in position by a wire ring having an interference fit with the piston. Additionally, novelty resides in the use of a retainer formed of wire or of stamped construction having protuberances defined thereon for retaining the cylinder end cap upon the cylinder in a manner to permit ease and safety of assembly, and uniform force distribution. Further, an embodiment is disclosed having a permanently mounted piston retractor wherein a removable insert is employed therewith to hold the piston rod in a retracted position during shipping and installation, and is removed during normal operation of the brake actuator.

10 Claims, 9 Drawing Figures

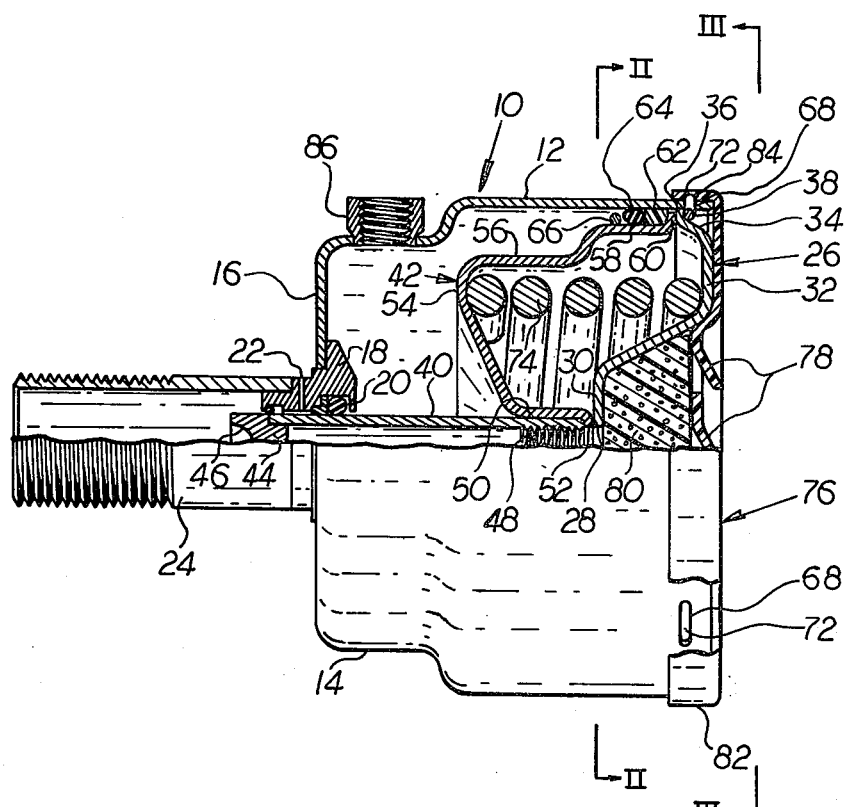
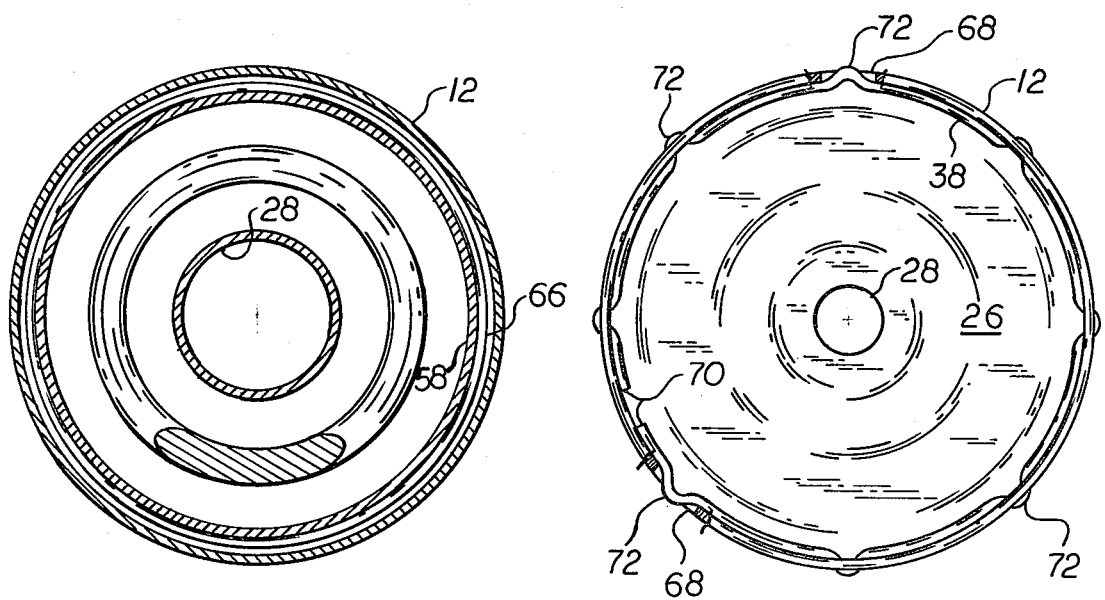
Fig. 1.
Fig. 2.
Fig. 3.

BRAKING ACTUATOR

BACKGROUND OF THE INVENTION

Braking structure for heavy duty vehicles, such as trucks and trailers, often include a brake actuator which is of the spring operated fail-safe type. The actuator is in the form of an expansible chamber motor and a piston and piston rod assembly is reciprocal within a cylinder, while a helical spring within the cylinder biases the piston and piston rod in a braking direction. Displacement of the piston is controlled by a pressurized medium, such as air or hydraulic fluid, introduced within the cylinder exerting a force upon the piston counter to that imposed by the spring. Braking is achieved by reducing the medium pressure to permit the spring to produce the braking force, and pressurizing the cylinder will retract the piston and rod into a nonbraking condition.

In prior art brake actuators of the aforedescribed type the piston is usually of a cast and machined construction, and is expensive to produce. Such conventional construction, in addition to its cost, adds significant weight to the actuator, and as a plurality of actuators are mounted upon a vehicle the actuators' weight is accumulative.

The actuators of the aforedescribed type also employ a cylinder end cap or head remote from the end of the expansible chamber motor through which the piston rod extends. The compression spring bears against this end cap, and in view of the high axial forces exerted upon the end cap a dependable and high strength interconnection between the end cap and cylinder must be maintained. In the past, a plurality of screws, often eight in number, have been employed to interconnect the end cap to the cylinder. While such an interconnection provides the necessary strength and resistance to axial force, the installation of the screws is time consuming, expensive, requires orientation between the end cap and cylinder, and may necessitate special equipment during installation.

It is an object of the invention to provide a brake actuator of the expansible chamber motor type wherein a majority of the components are formed of sheet metal, including the piston, and wherein acceptable strength and wear characteristics are achieved.

A further object of the invention is to provide a brake actuator of the expansible chamber motor type utilizing a sheet metal piston of a drawn construction wherein a piston rod is attached to the piston by an interference press fit, and wherein a wire ring forced upon the piston periphery retains the piston seal adjacent the cylinder.

Another object of the invention is to provide a vehicle brake actuator of the expansible chamber motor type wherein a heavy duty compression spring provides the braking force, and wherein the spring engages a cylinder end cap which is assembled to the cylinder by a single retainer ring.

A further object of the invention is to provide an expansible chamber motor brake actuator of the spring powered type employing an end cap retainer ring wherein the spring force is employed in maintaining the retainer in operative position.

In the practice of the invention the brake actuator comprises an expansible chamber motor having a sheet metal cylinder. At one end of the cylinder a seal is defined slidably receiving a piston rod, and at the other cylinder end a head or end cap is located which is removably mounted on the cylinder by a contractable retaining ring. A piston is mounted upon the piston rod within the cylinder chamber, and a heavy duty compression spring interposed between the end cap and piston biases the piston and piston rod in a braking direction. An inlet for the pressurized medium is defined in the cylinder wall for pressurizing the cylinder chamber on the opposite side of the piston with respect to the spring to permit hydraulic fluid, or compressed air, to shift the piston in a spring compressing, non-braking, direction.

In accord with the invention the piston is of a drawn sheet metal construction. The piston includes a central recess having a diameter less than that of the piston rod whereby the piston rod is pressed into the piston recess to complete the assembly of the piston and piston rod, and an abutment shoulder is defined in the piston recess to limit the extent of insertion of the rod into the recess, and aids in the transference of axial forces between the piston and piston rod.

Further, the piston is provided with sealing ring structure at its periphery, and the sealing ring structure is maintained in position by a circular metal ring which is pressed upon the piston periphery in an interference fit. In this manner, the sealing ring structure is retained upon the piston in a most economical manner without requiring machining or additional operations to the piston.

The cylinder end cap is also of a sheet metal construction and is assembled to the cylinder by a split contractable ring. A plurality of openings are defined within the cylinder wall adjacent its "open" end, and when assembling the actuator the end cap is inserted into the cylinder open end inwardly of the cylinder openings. Thereupon, a split retaining ring of a generally circular configuration which includes a plurality of radially extending projections is contracted and inserted within the cylinder such that the projections are received within and extend outwardly through the cylinder openings when the ring expands, and the end cap is permitted to move back against the retaining ring once the ring has expanded due to the alignment of the ring projections with the cylinder openings. The configuration of the end cap adjacent the retaining ring is such that the end cap maintains the retaining ring in an expanded condition preventing radial contraction of the ring, and assuring a firm and foolproof mounting of the end cap on the cylinder which will not loosen from vibration and is relatively tamperproof.

In an embodiment of the invention a permanent "back-off" bolt is mounted upon the piston rod for maintaining the spring between the end cap and piston in a compressed state wherein the piston rod is retracted for shipping and installation purposes. In contradistinction to the usual back-off bolt operation wherein the bolt is only installed in the piston rod during installation, or for the purpose of manually compressing the piston spring, the bolt is permanently mounted within and carried by the piston rod. The bolt includes an enlarged head, and the end cap has an opening having a greater transverse dimension than that of the bolt head wherein the bolt and its head freely move through the end cap opening during the normal actuator operation. For shipping and installation purposes, an insert is located between the bolt head and the end cap opening when the piston rod is retracted, and as the insert is of greater dimension than the end cap opening the insert will prevent the bolt head from passing through the end cap opening and the bolt will retain the piston rod in a retracted condition. After installation, pressurization of the cylinder further compresses the piston spring permitting the insert to be removed from between the bolt head and the end cap, and normal operation of the brake actuator is possible while the back-off bolt remains in the piston rod.

BRIEF DESCRIPTION OF THE DRAWINGS

The aforementioned objects and advantages of the invention will be appreciated from the following description and accompanying drawings wherein:

FIG. 1 is an elevational view, partially in section, of a brake actuator in accord with the invention illustrating the piston in the retracted non-braking position, FIG. 2 is an elevational sectional view, taken along Section II of FIG. 1, FIG. 3 is an end view, partially sectioned, of the brake actuator as taken from the right of FIG. 1, with the dust cover removed.

DESCRIPTION OF THE PREFERRED EMBODIMENT

Figure 4:
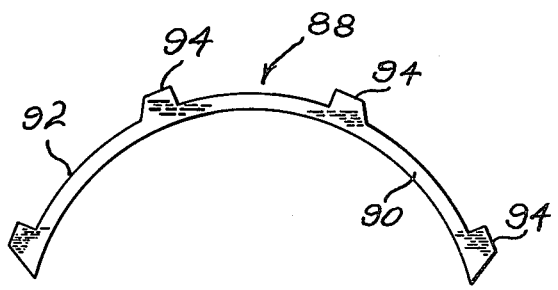
FIG. 4 is an elevational view of another type of end cap retainer.

With reference to FIG. 1, a pressure operated brake actuator in accord with the invention includes a sheet metal cylinder 10, having a cylindrical wall 12. In the disclosed embodiment the cylinder is of a "stepped" construction also including a smaller diameter wall portion 14, which is to minimize the overall size of the actuator and permit clearance with respect to vehicle suspension components, not shown. However, it is to be understood that the cylinder wall 12 may extend the entire axial distance of the expansible chamber motor dimension, and the stepped construction does not constitute an inventive concept.

The cylinder 10 includes a closed end 16 in which the seal gland 18 is mounted, and the seal gland includes a recess for receiving O-ring 20, and a drain port 22 is defined in the gland communicating with the bore thereof. A tubular threaded extension 24 is mounted upon the gland 18, and the extension constitutes the mounting structure for the actuator as it is threaded into the brake structure, not shown, with which the actuator is employed.

The "open" end of the expansible chamber actuator is at the right of FIG. 1, and this end of the cylinder 10 is closed by the sheet metal end cap 26. The end cap 26 is of the configuration which will be appreciated from FIG. 1, and includes a central opening 28 adjacent the radially extending portion 30. The end cap is deformed to the right defining the spring anchor surface 32, and is formed inwardly to define a conical surface 34 adjacent the peripheral portion 36 which is radial in its orientation. The end cap 26 is affixed to the cylinder wall 12 by a retaining ring generally indicated at 38, which is described in detail below.

Internally, the actuator includes a piston rod 40, and a piston 42. The piston rod 40 is of a tubular construction, and includes at its outer end a pad 44 affixed thereto having a recess 46 which receives a brake rod, not shown, which is axially operated by the actuator to produce braking. The piston rod is sealingly associated with the gland ring 20, and at its inner end, the rod is threaded at 48 to receive a "back-off" bolt, not shown, which is used to manually compress the spring for shipping and installation purposes.

The piston 42 is formed of sheet metal, and is drawn to have the configuration apparent in FIG. 1. The piston includes a central cylindrical recess 50 which is defined by the annular radially extending shoulder portion 52. The piston portion 54 constitutes a spring engaging portion, and the piston is stepped at 56 to provide clearance with the cylinder step 14. The piston includes a cylindrical seal ring support portion 58, and its outermost periphery is defined by the radially extending flange 60.

Seal ring elements are mounted upon the piston surface 58 to seal the piston with respect to the cylinder wall 12, and this sealing structure includes a packing ring 62 which may be of nylon, or the like, which abuts against the piston flange 60. An O-ring 64 is also located upon the piston portion 58 adjacent the packing ring 62, and the O-ring sealingly engages the cylinder wall 12.

The O-ring 64 is maintained upon the piston portion 58 by a circular wire ring 66. The ring 66 is of a relatively soft wire and has a normal internal diameter slightly less than the outer diameter of the piston portion 58 wherein the wire ring 66 must be forced upon the piston portion 58 and an interference press fit exists between the ring and the piston 42. When mounting the wire ring 66 upon the piston the ring is expanded beyond its yield point wherein a very firm assembly between the ring and piston exists.

The piston rod 40 is of a normal outer diameter slightly greater than the diameter of the piston recess 50, and the piston rod is pressed into the piston recess with an interference fit until the piston rod engages the shoulder 52. Thus, it will be appreciated that a quick and effective assembly between the piston and piston rod is achieved.

The cylinder wall 12 is provided with a plurality of elongated openings 68, FIG. 3, adjacent the cylinder open end, and these openings are equally circumferentially located about the cylinder wall. The retaining ring 38 cooperates with the openings 68 to maintain the end cap 26 upon the cylinder, and the configuration of the retaining ring is best appreciated from FIG. 3.

The retaining ring 38 is of a split circular configuration having ends 70, wherein the ring may be diametrically contracted. A plurality of projections 72 are defined along the ring 38 radially extending outwardly, and of a circumferential spacing as to be readily received within the cylinder openings 68. Thus, by contracting the ring 38 the ring may be inserted within the cylinder wall 12, the projections 72 aligned with the cylinder wall openings 68, and the ring permitted to expand whereby each cylinder opening receives a projection 72, as shown in FIG. 3.

The assembly of the ring 38, end cap 26 and cylinder wall 12 is readily achieved by displacing the end cap to the left, FIG. 1, beyond the openings 68.

During this assembly a back-off bolt, not shown, is threaded into the piston rod threads 48, the head of the bolt bearing against the end cap portion 30. In this manner the piston rod 40 is drawn to the right to compress spring 74, and with the spring so compressed it is possible to readily displace the end cap 26 inwardly.

Compression of the spring 74 and displacing the end cap 26 inwardly of the openings 68 permits the retainer ring 38 to be readily contracted to insert the projections 72 into the openings 68 as in FIG. 3. Once the projections and openings are aligned the ring is released and expands, and the end cap 26 is brought back to engage the retainer ring 38, as will be noted in FIG. 1, wherein portion 36 contacts the ring. Due to the oblique orientation of the end cap surface 34 the surface will tend to force the ring 38 outwardly, assuring a full expansion of the ring and a complete insertion of the projections 72 into their associated opening 68. When the back-off bolt is removed the spring 74 expands and the end cap portion 36 abuts against the circular portion of the retainer ring, and in this manner the end cap 26 is firmly held within the cylinder wall 12 against the axial forces imposed thereon by the spring 74.

A dust cover 76, which may be formed of a synthetic plastic material, includes a radial portion in which louvers 78 are formed. An open cell foam filter 80 is attached to the inside of the dust cover 76 in communication with the end cap opening 28, and the louvers and filter provide venting for the actuator. The dust cover 76 is held in place by the cylindrical flange 82 which extends over the cylinder wall 12, and includes a groove 84 which receives the outermost portions of the ring projections 72.

Fluid pressure is introduced into the cylinder 10 by the threaded fitting 86 mounted in stepped wall 14, and a supply of hydraulic fluid, not shown, selectively communicates with the fitting. The actuator is installed by attaching the cylinder 10 to the brake mechanism by the extension 24, and a brake actuator rod, not shown, is received within the piston pad recess 46, in the known manner.

Normally, the piston 42 will be maintained in the retracted position shown in FIG. 1 by the existence of hydraulic pressure within the fluid located at the left of the piston. During braking, the fluid pressure is reduced permitting the spring 74 to bias the piston and piston rod to the left and apply the brakes.

The ring 66 is effective to maintain the O-ring 64 upon the piston surface 58 as the only time that the O-ring will engage the ring 66 is when the piston is manually moved to the right by a back-off bolt cooperating with piston rod threads 48 during assembly or maintenance. At other times, the fluid pressure within the cylinder 10 will maintain the O-ring 64 against the packing ring 62 and the back-off bolt will not be in use.

It will be appreciated that the retaining ring 38 will maintain its assembly with the cylinder wall 12 and end cap 26 regardless of vibration in view of the axial biasing force maintained upon the end cap and the outward camming action on the retainer ring provided by the end cap surface 34. The even circumferential spacing of the cylinder wall openings 68 and projections 72 assures an even distribution of forces from the end cap to the cylinder wall, and a most effective connection between the end cap and cylinder is achieved.

Figure 5:
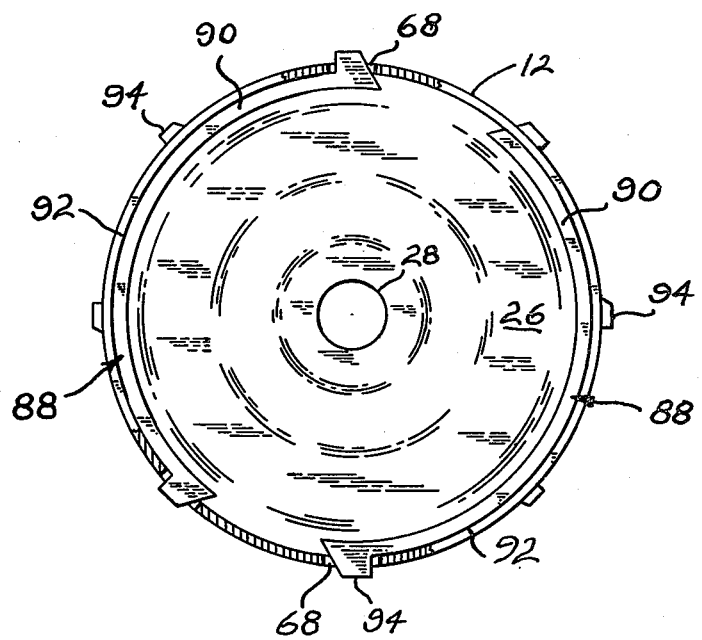
FIG. 5 is an end view of the brake actuator, partially sectioned, utilizing the end cap retainer of FIG. 4.

Another embodiment of retainer for the end cap 26 is shown in FIGS. 4 and 5. In this embodiment the retainer 88 is stamped of sheet metal and may be very accurately dimensioned. The sheet metal of which the retainer is fabricated is of a thickness slightly less than the width of the cylinder side wall openings 68, and the retainer 88 consists of an arcuate radially contractable circular segment portion 90 having an outer circular edge surface 92. The retainer includes four radially extending projections 94 which are circumferentially equally spaced from each other extending from the edge 92, and extend a radial distance from the edge 92 as to be received within the openings 68, and extend slightly therebeyond as appreciated from FIG. 5. The segmental portion 90 extends through an arcuate angle less than 180°.

As appreciated in FIG. 5, two retainers 88 are required to attach the end cap 26 to the cylinder wall 12. As in the previously described embodiment of retainer, prior to the retainers 88 being installed, the end cap 26 must be displaced inwardly within cylinder wall 12 beyond the openings 68. Thereupon, the two retainers 88 are slightly radially contracted and are located within the cylindrical wall 12 such that a projection 94 aligns with each opening 68, and extends therein. Thereupon, the end cap 26 is permitted to move outwardly toward the open end of the cylindrical wall 12 until the peripheral portion 36 engages the retainer portion 90, and further axial displacement of the end cap 26 is prevented since the retainers are fixed against axial displacement by the reception of the projections 94 within the openings 68.

As with the wire retainer ring 38, the surface 34 of the end cap 26 will prevent the retainers from being deformed inwardly, and a tamperproof retention of the end cap 26 is achieved which will not release due to vibration. The dust cover 76 is used with the retainers 88 in the same manner as with wire ring 38 as the dust cover groove 84 will snap over the ends of the projections 94.

The aforedescribed use of the retaining ring 38 or the retainers 88 to assemble the end cap 26 to the cylindrical wall 12 is an important safety feature. With prior art devices wherein the end cap was mounted upon the cylindrical wall by bolts, it was possible for a mechanic to remove the bolts when axial force was imposed upon the end cap 26 by the spring 74. Thus, upon release of the last bolt the end cap 26 may be projected from the cylinder 10 with considerable force and may inflict serious injury upon the mechanic. Such a possibility will not occur with the end cap retainers disclosed as the end cap 26 must initially be displaced inwardly within cylindrical wall 12 before the retaining ring 38 or the retainers 88 can be removed. Thus, it is necessary for the mechanic to either use the back-up bolt within threads 48 to confine the spring force between the piston 42 and end cap 26, or the assembly must be placed within a press which mechanically forces the end cap 26 inwardly to permit assembly or disassembly of the retainers. Thus, accidental high velocity release of the end cap is prevented with the practice of the disclosed apparatus.

The drain port 22 is located between O-rings mounted within the piston seal gland 18, and establishes communication between the gland seals and the atmosphere. Thus, should pressurized fluid escape beyond the primary seal ring 20 the fluid will be discharged to the atmosphere and fall to the ground, rather than contaminating the interior of the extension 24 and possibly enter the vehicle brake system.

Figure 6:
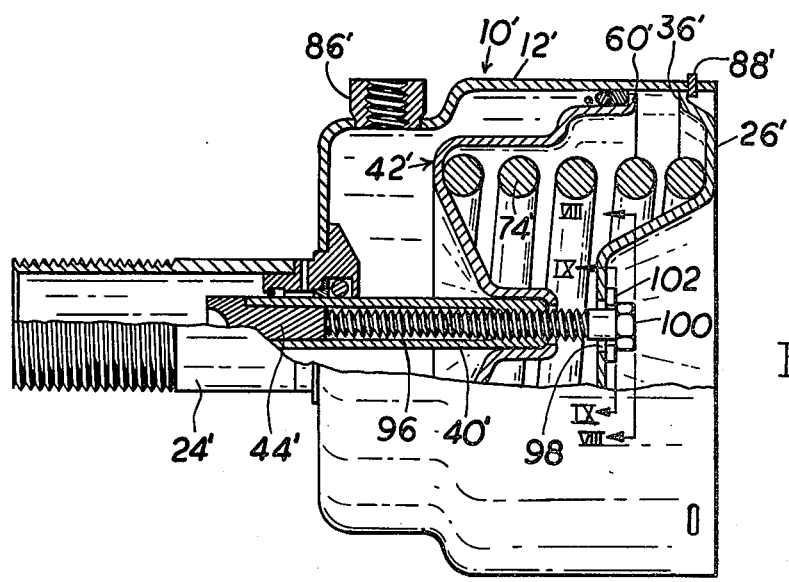
FIG. 6 is an elevational view, partially in section, illustrating an embodiment of brake actuator illustrating the piston rod in the retracted shipping and installation condition as held by the back-off bolt.
Figure 7:
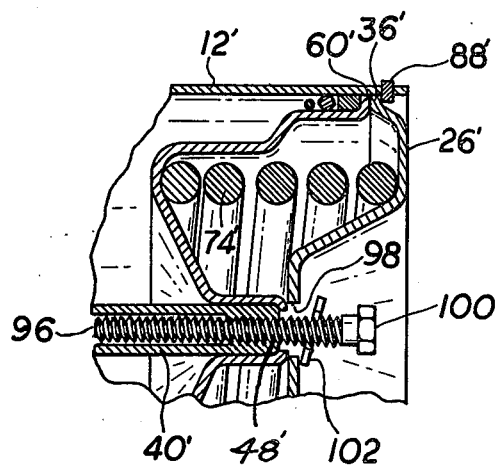
FIG. 7 is a detailed sectional view of the embodiment of FIG. 6 illustrating the condition of the piston and back-off bolt upon initial pressurization of the actuator illustrating the insert prior to removal.

Another variation of the invention is shown in FIGS. 6–9, and in these figures components similar to those previously described are indicated by primed reference numerals. The embodiment of FIGS. 6–9 also utilizes a dust cover such as at 76, but for purpose of illustration the dust cover is not shown in these figures. In FIGS. 6 and 7 the retainer 88' is illustrated as mounting the end cap 26' upon the cylindrical wall 12'.

In this embodiment the piston rod pad 44' extends into the piston rod 40' a greater distance than in the previously described embodiment, and the pad serves as an abutment against which the back-off bolt engages.

In FIGS. 6 and 7 the back-off bolt 96 is illustrated as cooperating with the piston rod threads 48'. In the embodiment of FIG. 1 a similar back-off bolt is used to retract the piston rod and compress the spring 74. The back-off bolt is of such length as to engage the pad 44' and upon tightening the bolt against the pad the bolt will be firmly mounted within the piston rod 40'. The bolt includes an enlarged hexagonal head at its outer end.

In the usual construction, such as shown in the embodiment of FIG. 1, the opening 28 within the end cap 26 is only slightly larger than the bolt shank wherein the bolt head may bear directly against the end cap, and the back-off bolt must be entirely removed from the piston rod to permit the normal operation of the brake actuator. However, in the disclosed embodiment the end cap opening 98 is of a diameter greater than the maximum transverse dimension of the bolt head 100, as apparent from FIG. 8, and the bolt head readily passes through the opening 98 as the piston rod moves between its extended and retracted positions.

Figures 8, 9:
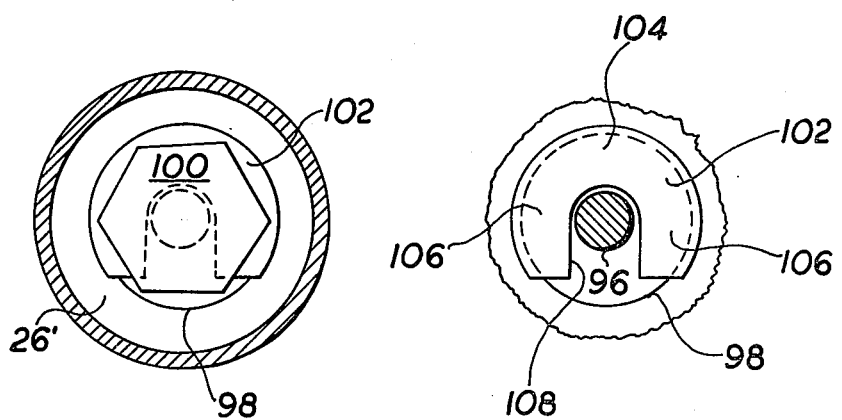
FIG. 8 is an enlarged elevational sectional view of the back-off bolt head and end cap as taken along Section VIII—VIII of FIG. 6.
FIG. 9 is an enlarged elevational sectional view illustrating the configuration of the insert as taken along Section IX—IX of FIG. 6.

The piston rod 40' is retained in its retracted condition for shipping and installation purposes by a U-shaped insert 102 interposed between the head 100 and the end cap 26' adjacent the opening 98. The insert 102 is best shown in FIG. 9, and includes a base portion 104 from which depend leg portions 106. The leg portions define a throat 108 which is of a transverse dimension slightly greater than the bolt shank wherein the bolt shank is readily received within the insert throat. The diameter of the insert 102 is greater than the diameter of the opening 98, and upon the insert being located upon the bolt 96 as shown in FIGS. 6, 8 and 9, the insert prevents the bolt head 100 from passing through the opening 98.

The brake actuator is shipped and installed with the components in the relationship shown in FIG. 6. In this condition the piston rod 40' is partially retracted, and the spring 74' is also partially compressed. However, as will be appreciated from FIG. 6 the piston flange 60' has not engaged the peripheral portion 36' of the end cap, and further movement of the piston 42' to the right is possible.

With the components as shown in FIG. 6, the brake actuator may be assembled to the vehicle brake mechanism, and the pressurized system of the vehicle attached to fitting 86'. Thereupon, upon the cylinder 10' being pressurized the piston 42' will be moved its full extent to the right engaging peripheral portion 36' and flange 60', as shown in FIG. 7. This movement of the piston displaces the bolt head 100 to the right away from end cap 26' releasing the compression on the insert 102, and the insert may be readily removed from the bolt 96, or may fall from the bolt.

Upon the insert 102 being removed, the bolt head 100 may enter the confines of cylinder 10' through the end cap opening 98 as the brake actuator is operated and the piston rod extended. A dust cover, not shown, is placed over the end of the brake actuator as shown in FIG. 1, and the dust cover filter is recessed to provide clearance for the movement of the bolt and bolt head when the piston rod is fully retracted.

When it is desired to remove the brake actuator from the vehicle brake system it is not necessary to find a back-off bolt, as is the usual case, as the bolt is permanently mounted and carried by the piston rod 40'. However, the bolt head 100 is engaged by a wrench, and the bolt is removed from the piston rod and an enlarged washer, not shown, is placed thereon of a greater diameter than the opening 98. The bolt 96 is replaced within the piston rod and tightening thereof will draw the piston rod, manually, to a retracted condition permitting removal of the brake actuator from the vehicle.

It will be appreciated that in the embodiment of FIGS. 6–9 the permanent mounting of the back-off bolt on the piston rod eliminates the necessity to locate a back-off bolt when manual compression of the spring 74' is necessary. Further, the disclosed structure permits the brake actuator to be quickly installed as removal of the back-off bolt is not required, and the insert is very easily removed upon initially pressurizing the cylinder 10'.

It is appreciated that various modifications to the inventive concepts may be apparent to those skilled in the art without departing from the spirit and scope of the invention.

I claim:

1. An expansible motor brake actuator for vehicles characterized by its low cost, light weight and ease of assembly including a cylinder having an axis, a rod head and an end cap, a piston rod coincident with the cylinder axis reciprocally mounted within the cylinder and extending through the rod head, a piston mounted upon the piston rod within said cylinder having a periphery sealingly engaging the cylinder, and a compression spring interposed between the end cap and piston biasing the piston toward the rod head, the improvement comprising, said piston being formed of sheet metal and having a central cylindrical recess, said piston central recess having an open outer end disposed toward the cylinder rod head and an axially spaced inner end, an inwardly extending annular shoulder flange defined upon said piston depending from said recess inner end defining an abutment for limiting insertion of the piston rod into said recess, the piston rod having a diameter slightly greater than the diameter of said cylindrical recess and being pressed into said piston recess with an interference fit, said piston including a circular periphery, a cylindrical piston portion defined adjacent said periphery coaxial with said piston recess, said piston portion having a cylindrical outer surface, sealing ring means mounted upon said cylindrical outer surface, and a continuous circumference sealed retainer ring pressed upon said outer surface restraining said sealing ring means from excessive axial movement thereon, said cylindrical outer surface having a diameter greater than the normal inner diameter of said retainer ring whereby said retainer ring is pressed upon said outer surface and radially expanded thereby, the cylinder and end cap being formed of sheet metal, the cylinder having a cylindrical wall having an open end closed by the end cap, a plurality of openings defined in the cylindrical wall adjacent said open end and circumferentially spaced about said wall an equal distance from said open end thereof, the end cap being receivable within said cylinder open end and displaceable axially inwardly of said wall openings, an end cap retainer within the cylinder open end of generally circular segment configuration having a plurality of outwardly radially extending projections defined thereon, said retainer having a normal diameter substantially corresponding to the inner diameter of the cylinder wall whereby upon the end cap being displaced within the cylinder beyond said openings said retainer is located within the cylinder wall with said projections extending into said openings preventing axial displacement of said retainer and restraining the end cap from axial movement beyond said retainer toward said cylinder wall open end.

2. In an expansible motor brake actuator as in claim 1 wherein an annular seal gland is mounted within the cylinder rod head having a pair of axially spaced seals slidably sealingly engaging the piston rod, the improvement further comprising a drain port defined in the seal gland communicating with the atmosphere and the piston rod intermediate the seal gland seals.

3. In an expansible motor brake actuator as in claim 1, said cylinder wall openings being equally circumferentially spaced upon said cylinder wall and being of an elongated configuration, and said retainer comprising a wire ring and said projections comprising bends homogeneously defined in said ring radially extending outwardly from the ring circular configuration and extending through said wall openings.

4. In an expansible motor brake actuator as in claim 3, an annular conical surface defined upon the end cap in axial alignment with the ring circular portion within said cylinder wall engaging said retainer and tending to expand said retainer to maintain said projections within said openings.

5. In an expansible motor brake actuator as in claim 1, said cylinder wall openings being equally circumferentially spaced upon said cylinder wall and being of an elongated configuration, and said retainer comprising a sheet metal radially contractible circular segment of a thickness less than the width of said cylinder wall openings, and said projections homogeneously radially extending from said segment and extending through said wall openings.

6. In an expansible motor brake actuator as in claim 5, said sheet metal segment having an arcuate configuration less than 180°, a pair of said sheet metal retainer segments being utilized to retain said end cap upon said cylinder cylindrical wall.

7. In an expansible motor brake actuator as in claim 1 a dust cover mounted upon said cylinder open end enclosing said open end and end cap, an air vent defined in said dust cover, an air filter mounted on said dust cover filtering air passing through said vent, an axially extending flange circumferentially defined upon said dust cover closely extending over said cylinder wall and said wall openings, and an annular recess defined in said cover flange receiving said projections extending through said wall openings to maintain the assembly of said dust cover upon said cylinder open end.

8. An expansible motor brake actuator for vehicles including a cylinder having an axis, a rod head and an end cap, a piston rod coincident with the cylinder axis reciprocally mounted within the cylinder between retracted and extended positions and extending through the rod head, a piston mounted upon the piston rod within the cylinder having a periphery sealingly engaging the cylinder, a compression spring interposed between the end cap and piston biasing the piston toward the rod head, an extension mounted upon and coaxial with the piston rod extending from the piston rod in the direction of the end cap having an enlarged head defined thereon, the extension adapted to extend through an opening in the end cap when the piston rod is in the retracted position, the improvement comprising, the end cap opening having a transverse dimension greater than the extension head transverse opening whereby the head passes through the end cap opening during piston rod movement, and a removable insert having a maximum transverse dimension greater than the end cap opening insertable between the end cap and extension head when the piston rod is in the retracted position and located exteriorly of the end cap preventing the head from passing through the end cap opening and maintaining the piston rod in the retracted position.

9. In an expansible motor brake actuator as in claim 8 wherein the piston rod extension comprises a bolt threaded into the piston rod, the enlarged head being defined upon said bolt.

10. In an expansible motor brake actuator as in claim 8, said insert comprising a U-shaped member including a pair of leg portions depending from a base portion, said base portion having a transverse dimension greater than that of the end cap opening and said leg portions defining a throat having a width greater than the transverse width of the piston rod extension and less than the transverse dimension of the enlarged head.

* * * * *